United States Patent
Picard

(10) Patent No.: US 9,832,028 B2
(45) Date of Patent: Nov. 28, 2017

(54) AUTOMATIC POWER BUDGET MANAGEMENT FOR POWER-OVER-ETHERNET APPARATUS

(71) Applicant: Texas Instruments Incorporated, Dallas, TX (US)

(72) Inventor: Jean Picard, Hooksett, NH (US)

(73) Assignee: Texas Instruments Incorporated, Dallas, TX (US)

( * ) Notice: Subject to any disclaimer, the term of this patent is extended or adjusted under 35 U.S.C. 154(b) by 151 days.

(21) Appl. No.: 14/495,965

(22) Filed: Sep. 25, 2014

(65) Prior Publication Data

US 2016/0094350 A1 Mar. 31, 2016

(51) Int. Cl.
| | |
|---|---|
| G06F 1/00 | (2006.01) |
| H04L 12/10 | (2006.01) |
| G06F 1/26 | (2006.01) |
| H04L 12/931 | (2013.01) |
| G06F 1/18 | (2006.01) |

(52) U.S. Cl.
CPC .............. H04L 12/10 (2013.01); G06F 1/26 (2013.01); G06F 1/189 (2013.01); H04L 49/351 (2013.01); Y02B 60/33 (2013.01)

(58) Field of Classification Search
CPC ........ H04L 12/10; H04L 49/351; G06F 1/189
See application file for complete search history.

(56) References Cited

U.S. PATENT DOCUMENTS

| | | | | |
|---|---|---|---|---|
| 2004/0215779 A1* | 10/2004 | Weber | ....................... | G06F 1/26 709/226 |
| 2009/0083552 A1* | 3/2009 | Hussain | .................. | H04L 12/10 713/300 |
| 2010/0106985 A1* | 4/2010 | Panguluri | ............... | G06F 1/266 713/300 |
| 2014/0014958 A1* | 1/2014 | Oh | .......................... | H01L 22/00 257/48 |
| 2014/0245054 A1* | 8/2014 | Hamdi | ................ | G06F 11/3062 713/340 |

OTHER PUBLICATIONS

"IEEE 802.3at PoE High-Power PD Interface", Texas Instruments Incorporated, Mar. 2012, 27 pages. (see pp. 10-15), U.S.

* cited by examiner

*Primary Examiner* — Xuxing Chen
(74) *Attorney, Agent, or Firm* — Lawrence J. Bassuk; Charles A. Brill; Frank D. Cimino

(57) ABSTRACT

A power-over-Ethernet (PoE) apparatus is provided with PSE controllers that are cooperable to manage a global power budget of the PoE apparatus automatically. Information indicative of the global power budget is conveyed to a group of PSE controllers. The PSE controllers cooperate collectively to allocate the global power budget among themselves automatically and autonomously. This is accomplished in simple fashion without using a separate, programmed microcontroller. Each PSE controller also manages its own local power budget, allocating available local power among its own power sourcing ports.

14 Claims, 3 Drawing Sheets

AUTOMATIC POWER BUDGET MANAGEMENT FOR POWER-OVER-ETHERNET APPARATUS

FIELD

The present work relates generally to power-over-Ethernet (PoE) apparatus and, more particularly, to power budget management in PoE apparatus.

BACKGROUND

A conventional PoE apparatus (e.g., in accordance with IEEE 802.3-2009 or IEEE 802.3at) typically includes a plurality of power source equipments (PSEs), each of which includes a plurality of power sourcing ports that provide power to various applications coupled to the ports. Each PSE includes a controller (PSE controller) that manages a local power budget of the PSE, allocating the available local power among the power sourcing ports. The local power budgets of the PSEs are accounted for in a global (i.e., total) power budget of the PoE apparatus. The global power budget is typically managed by a suitably programmed microcontroller unit that allocates the total available power among the PSE controllers.

An example of a conventional PoE apparatus such as described above is shown diagrammatically in FIG. 1. A plurality of PSE controllers at 10 are coupled to a power management controller (microcontroller unit) 11 by a bus 12. The separate power management controller 11 manages the global power budget, but disadvantageously increases the design complexity, manufacturing expense and size of the PoE apparatus.

It is desirable in view of the foregoing to provide a solution for managing the global power budget of a PoE apparatus with reduced complexity, size and expense relative to conventional approaches such as the example described above.

DETAILED DESCRIPTION

Figure 1:
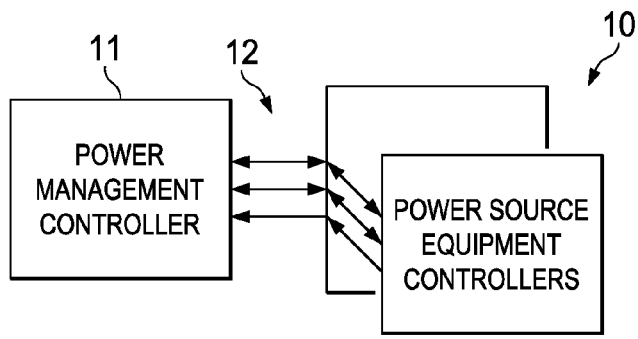
FIG. 1 diagrammatically illustrates a prior art PoE apparatus.

Example embodiments of the present work provide for a PoE apparatus (or system) having PSE controllers that are cooperable to manage the global power budget (total power available for distribution) of the PoE apparatus automatically, without the need for a separate microcontroller unit such as shown at 11 in FIG. 1. Information indicative of the global power budget is conveyed to a group of PSE controllers. The PSE controllers cooperate collectively to manage the global power budget, allocating the total available power among themselves automatically and autonomously. This is accomplished in simple fashion without using a separate, programmed microcontroller. Each PSE controller also manages its own local power budget, allocating available local power among its power sourcing ports.

Figure 2:
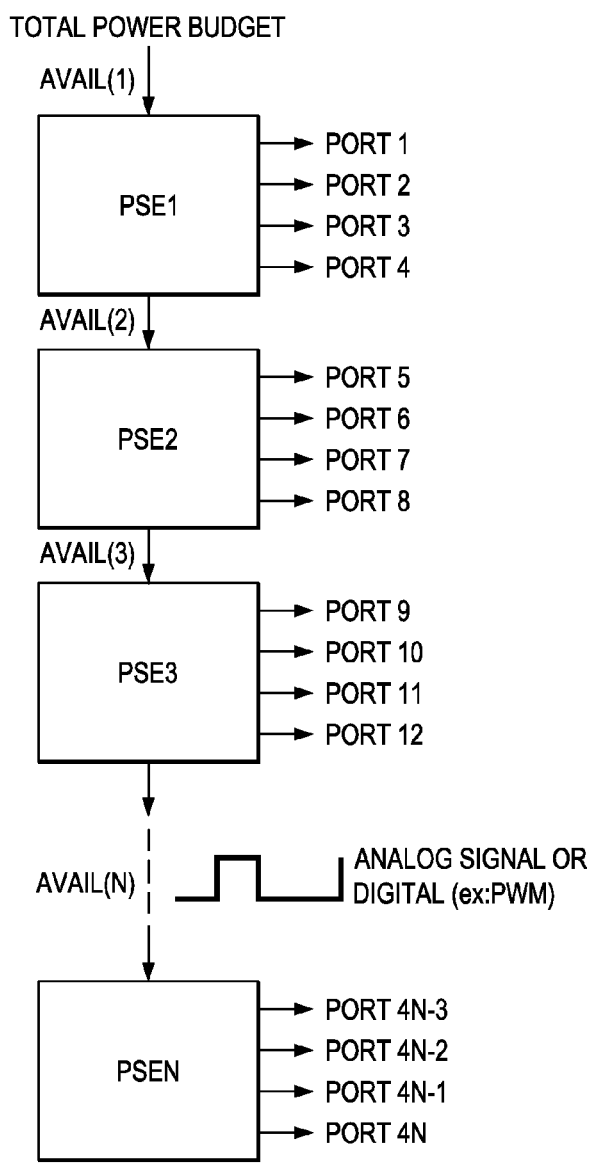
FIG. 2 diagrammatically illustrates a PoE apparatus according to example embodiments of the present work.

FIG. 2 diagrammatically illustrates a PoE apparatus according to example embodiments of the present work. A plurality of PSE controllers (a total of N) designated as PSE1-PSEN are connected in a series (daisy-chained) configuration, such that PSE1 has an output connected to an input of PSE2, etc., as shown. The order of the PSE controllers in the series configuration corresponds to their relative power sourcing priorities, with PSE1 having the highest priority, PSE2 having the next-highest priority, and so on to PSEN, which has the lowest priority. Each PSE controller controls a plurality of associated power sourcing ports (four ports each in the FIG. 2 example). These ports are designated as Port 1, Port 2, . . . Port 4N. Each PSE controller at PSE1-PSEN, together with its associated power sourcing ports, constitutes an instance of power source equipment.

PSE1 receives an input signal, designated as AVAIL(1), indicative of the global (total) power budget, that is, the total amount of power available to be distributed to and delivered by the power sourcing ports Port 1-Port 4N. PSE1 adjusts the global power budget to account for its own local power budget. In some embodiments, the local power budget of PSE1 represents the total amount of power available to be distributed to and delivered by the power sourcing ports Port 1-Port 4 associated with PSE1. In some embodiments, for example, PSE1 subtracts its local power budget from the global power budget, and then outputs to PSE2 a signal AVAIL(2) indicative of the remaining portion of the global power budget that is available to be distributed to and delivered by the power sourcing ports of PSE2-PSEN, namely Port 5-Port 4N. As indicated above, in some embodiments, the remaining portion of the global power budget is the difference between the global power budget and the local power budget of PSE1.

In the same fashion, PSE2 adjusts the power level indicated by AVAIL(2) to account for its own local power budget, and outputs to PSE3 a signal AVAIL(3) indicative of the remaining power available to be distributed to and delivered by the power sourcing ports of PSE3-PSEN, namely Port 9-Port 4N. As evident from FIG. 2, each of the PSE controllers receives a corresponding input signal AVAIL(n), and all except PSEN produce a corresponding output signal AVAIL(n+1), where n=1, 2, 3, . . . N−1. Ultimately, PSEN, at the end of the series configuration, receives input signal AVAIL(N) that is, in some embodiments, indicative of the power available to be distributed to and delivered by its associated power sourcing ports Port 4N-3-Port 4N.

In various embodiments, the signals AVAIL(1)-AVAIL(N) are implemented according to various suitable signaling techniques, either analog or digital. In some embodiments, for example the signals AVAIL(1)-AVAIL(N) are provided as DC voltage levels. In some embodiments, the signals are provided as current levels (through suitable resistors external to the PSE controllers). In some embodiments, the signals are provided as digital codes, for example, by pulse width modulation. Workers in the art will recognize that these and other signaling techniques are readily applicable to the object of providing an indication of an amount of power.

Figure 3:
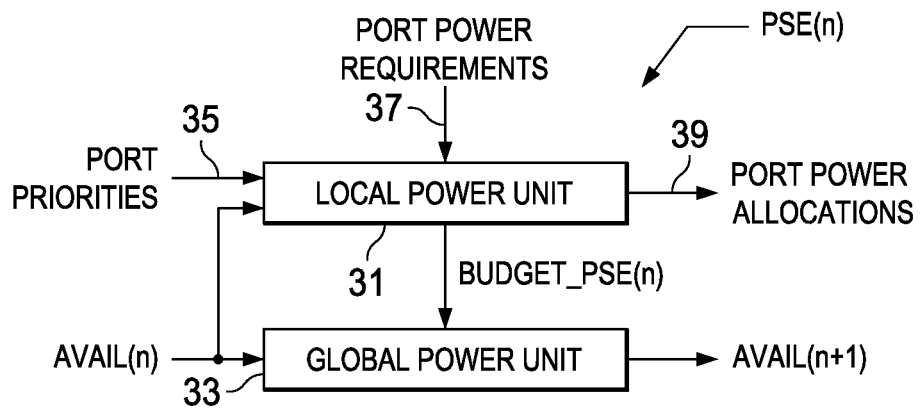
FIG. 3 diagrammatically illustrates a PSE controller of FIG. 2 in more detail according to example embodiments of the present work.

FIG. 3 diagrammatically illustrates a PSE controller of FIG. 2 in more detail according to example embodiments of the present work. The PSE controller of FIG. 3 is designated as PSE(n), namely, the nth PSE controller in a series configuration such as shown in FIG. 2, for n=1, 2, . . . N−1. As shown, PSE(n) includes a local power unit 31 that manages the local power budget of PSE(n), and a global power unit 33 that participates in management of the global power budget of the PoE apparatus. Local power unit 31 uses the AVAIL(n) input (see also FIG. 2) together with port power sourcing requirement information 37, that represents respective power sourcing requirements of the power sourcing ports of PSE(n), to determine PSE(n)'s local power budget, BUDGET_PSE(n). Ideally, BUDGET_PSE(n) is equal to the total power requirement indicated by the information 37. However, BUDGET_PSE(n) will be limited to a predetermined portion of the available power indicated by AVAIL(n), depending on the relative priority of PSE(n). Thus, BUDGET_PSE(n) is not necessarily equal to the total power requirement indicated by the information 37. Local power unit 31 uses BUDGET_PSE(n) together with information 37 and port priority information 35 to determine power allocation among the power sourcing ports associated with PSE(n). The priority information 35 represents the relative port priorities among the power sourcing ports of PSE(n). In various embodiments, these priorities may be assigned arbitrarily, or assigned based on port numbering, or the assignments may be implementation specific.

In some embodiments, the information 37 indicates actual power sourcing requirements. In some embodiments, the information 37 indicates expected power sourcing requirements. In various embodiments, one or both of the port priority information 35 and the power requirement information 37 are provided externally, and programmed into PSE (n). In various embodiments, one or both of the port priority information 35 and the power requirement information 37 are determined autonomously by PSE(n).

BUDGET_PSE(n) is provided to the global power unit 33, which uses it in combination with the received AVAIL(n) input signal to produce the AVAIL(n+1) output signal. It should be evident that the global power unit 33 may be omitted from the last controller in the series chain, PSEN (see also FIG. 2).

Figure 4:
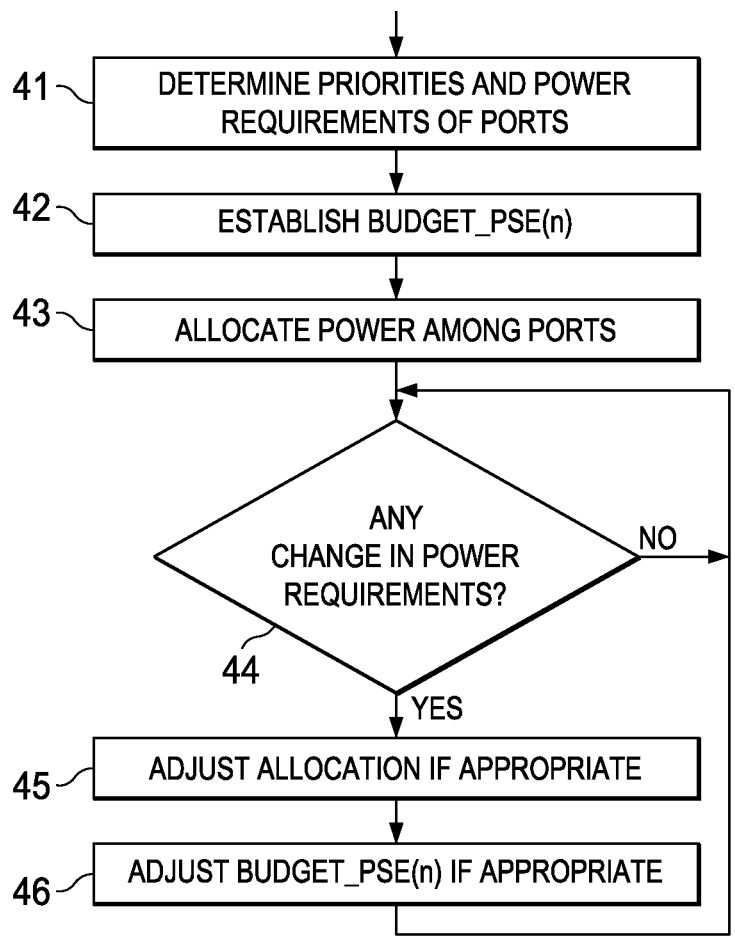
FIGS. 4 and 5 illustrate operations performed according to example embodiments of the present work.

FIG. 4 illustrates operations described above according to example embodiments of the present work. In some embodiments, the local power unit 31 (see also FIG. 3) is capable of performing the operations illustrated in FIG. 4. The relative priorities of the power sourcing ports, and the port power requirements are determined at 41. At 42, BUDGET_PSE(n) is established based on the input AVAIL(n) (see also FIGS. 2 and 3) and the power requirements determined at 41. At 43, power is allocated among the ports based on BUDGET_PSE(n), the port priorities and the port power requirements. In some embodiments, the operations at 41 and 43 are accomplished in accordance with known techniques utilized in conventional PSE controllers.

At 44, the port power requirements are monitored. Any change(s) noted in the port power requirements at 44 may trigger adjustment of either, or both, of the port power allocation and BUDGET_PSE(n), as may be appropriate. These selective adjustments of power allocation and BUDGET_PSE(n) are respectively shown at 45 and 46. For example, any change in the power sourcing requirement of any port may result in: (1) adjustments (up, down, or both) of port power allocations consistent with the relative port priorities; (2) an adjustment (up or down) of BUDGET_PSE (n) consistent with the relative priority of PSE(n); or (3) a combination of the adjustments (1) and (2). As seen from FIGS. 2 and 3, adjustment of BUDGET_PSE(n) can result in an adjustment of AVAIL(n+1), and a corresponding adjustment in the allocation of the global power budget, that is, an adjustment in how the total amount of power indicated by AVAIL(1) in FIG. 2 is allocated among PSE1-PSEN. Note that PSEN (see also FIG. 2) may be capable of performing all operations in FIG. 4, but need not establish or adjust a local power budget. Instead, the local power budget for PSEN is defined by its input signal AVAIL(N).

Figure 5:
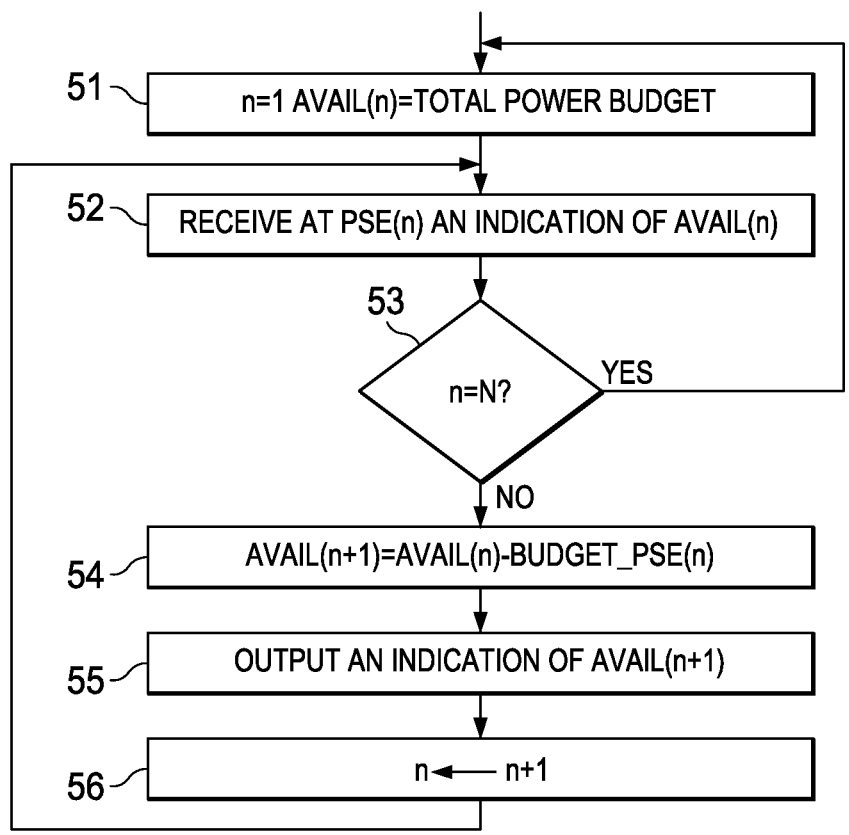

FIG. 5 illustrates operations described above according to example embodiments of the present work. In some embodiments, the PoE apparatus of FIGS. 2 and 3 (having N PSE controllers) is capable of performing the operations shown in FIG. 5. Accordingly, the operations of FIG. 5 may be understood with reference also to FIGS. 2-4. At 51, the aforementioned index n is initialized to n=1. Also at 51, AVAIL(n)=AVAIL(1) is initialized to be equal to the global (total) power budget of the PoE apparatus. At 52, PSE(n) receives an indication of AVAIL(n). If n=N at 53, then operation returns to 51. Otherwise, at 54, AVAIL(n+1) is set equal to AVAIL(n)-BUDGET_PSE(n) at 54 (see also FIGS. 3 and 4). Although simple subtraction is shown at 54 in the example of FIG. 5, various embodiments compare AVAIL(n) to BUDGET_PSE(n) in various manners to determine AVAIL(n+1). An indication of AVAIL(n+1) is output at 55, after which the index n is updated at 56 and operation returns to 52.

As is apparent from the foregoing description, the present work provides PSE controllers arranged advantageously to cooperate collectively and manage the global power budget of a PoE apparatus automatically and autonomously, without the need for a separate, programmed microcontroller unit.

Although example embodiments of the present work have been described above in detail, this does not limit the scope of the work, which can be practiced in a variety of embodiments.

What is claimed is:

1. A method of managing power distribution in a power-over-Ethernet apparatus that contains a plurality of power source equipment (PSE) controllers, comprising:
   providing a first indication of a first amount of power that is available to be distributed cumulatively by the plurality of PSE controllers;
   in response to the first indication, using the plurality of PSE controllers collectively and cooperatively to make a determination of how the first amount of power is allocated among the plurality of PSE controllers, wherein said determination is made autonomously by the plurality of PSE controllers;
   in each of the PSE controllers, except a lowest priority of the PSE controllers:
   continually adjusting a power budget of the PSE controller based on a priority value assigned to the PSE controller, a change in a power sourcing requirement of a port controlled by the PSE controller, and a priority value assigned to the port; and
   responsive to an adjustment of the power budget, adjusting a power value indicative of an amount of power available to PSE controllers having a lower priority than the PSE controller; and
   communicating the power value to one of the PSE controllers having a next lower priority than the PSE controller.

2. The method of claim 1, wherein said using includes:
   receiving the first indication at a first PSE controller, wherein the first PSE controller has a higher power source priority than any other PSE controller among the plurality of PSE controllers;
   based on the first amount of power, determining at the first PSE controller a second amount of power that is available to be distributed cumulatively by all of the PSE controllers other than the first PSE controller, wherein the second amount of power is less than the first amount of power;

outputting from the first PSE controller to a second PSE controller a second indication of the second amount of power, wherein the second PSE controller has a power source priority that is lower than that of the first PSE controller and higher than that of any other PSE controller among the plurality of PSE controllers; and receiving the second indication at the second PSE controller.

3. The method of claim 2, wherein said using includes:

based on the second amount of power, determining at the second PSE controller a third amount of power that is available to be distributed cumulatively by all of the PSE controllers other than the first and second PSE controllers, wherein the third amount of power is less than the second amount of power;

outputting from the second PSE controller to a third PSE controller a third indication of the third amount of power, wherein the third PSE controller has a power source priority that is lower than those of the first and second PSE controllers and higher than that of any other PSE controller among the plurality of PSE controllers; and receiving the third indication at the third PSE controller.

4. The method of claim 2, wherein said determining includes comparing the first amount of power to a local power budget that represents a total amount of power available to be distributed by the first PSE controller.

5. The method of claim 4, wherein said determining includes determining the local power budget based on the first amount of power and power requirements of a plurality of power source ports associated with the first PSE controller.

6. The method of claim 4, wherein said comparing includes subtracting the local power budget from the first amount of power.

7. A power-over-Ethernet apparatus, comprising:

a plurality of interconnected power source equipment (PSE) controllers; and an input coupled to said plurality of PSE controllers for providing a first indication of a first amount of power that is available to be distributed cumulatively by said plurality of PSE controllers;

wherein said plurality of PSE controllers are collectively cooperable in response to said first indication to make a determination of how the first amount of power is allocated among said plurality of PSE controllers, and wherein said determination is made autonomously by said plurality of PSE controllers;

wherein each of the PSE controllers, except a lowest priority of the PSE controllers, is configured to:

continually adjust a power budget of the PSE controller based on a priority value assigned to the PSE controller, a change in a power sourcing requirement of a port controlled by the PSE controller, and a priority value assigned to the port; and responsive to an adjustment of the power budget, adjust a power value indicative of an amount of power available to PSE controllers having a lower priority than the PSE controller; and communicate the power value to one of the PSE controllers having a next lower priority than the PSE controller.

8. The apparatus of claim 7, including:

a first of said PSE controllers coupled to said input to receive the first indication, wherein said first PSE controller has a higher power source priority than any other PSE controller among said plurality of PSE controllers, said first PSE controller configured for determining, based on said first amount of power, a second amount of power that is available to be distributed cumulatively by all of said plurality of PSE controllers other than said first PSE controller, wherein the second amount of power is less than the first amount of power, and said first PSE controller configured for outputting a second indication of the second amount of power; and a second of said PSE controllers coupled to said first PSE controller and configured to receive the second indication, wherein said second PSE controller has a power source priority that is lower than that of said first PSE controller and higher than that of any other PSE controller among said plurality of PSE controllers.

9. The apparatus of claim 8, wherein said second PSE controller is configured for determining, based on the second amount of power, a third amount of power that is available to be distributed by all of said PSE controllers other than said first and second PSE controllers, said second PSE controller further configured for outputting a third indication of the third amount of power, wherein the third amount of power is less than the second amount of power, and including a third of said PSE controllers coupled to said second PSE controller and configured to receive the third indication, wherein said third PSE controller has a power source priority that is lower than those of said first and second PSE controllers and higher than that of any other PSE controller among said plurality of PSE controllers.

10. The apparatus of claim 8, wherein said determining includes comparing the first amount of power to a local power budget that represents a total amount of power available to be distributed by said first PSE controller.

11. The apparatus of claim 10, wherein said determining includes determining the local power budget based on the first amount of power and power requirements of a plurality of power source ports associated with said first PSE controller.

12. The apparatus of claim 8, wherein one of the first and second indications includes an analog signal.

13. The apparatus of claim 8, wherein one of the first and second indications includes a digital signal.

14. The apparatus of claim 7, wherein said PSE controllers have respective power source priorities and are connected in a series configuration according to their respective power source priorities.

* * * * *